United States Patent Office 3,267,024
Patented August 16, 1966

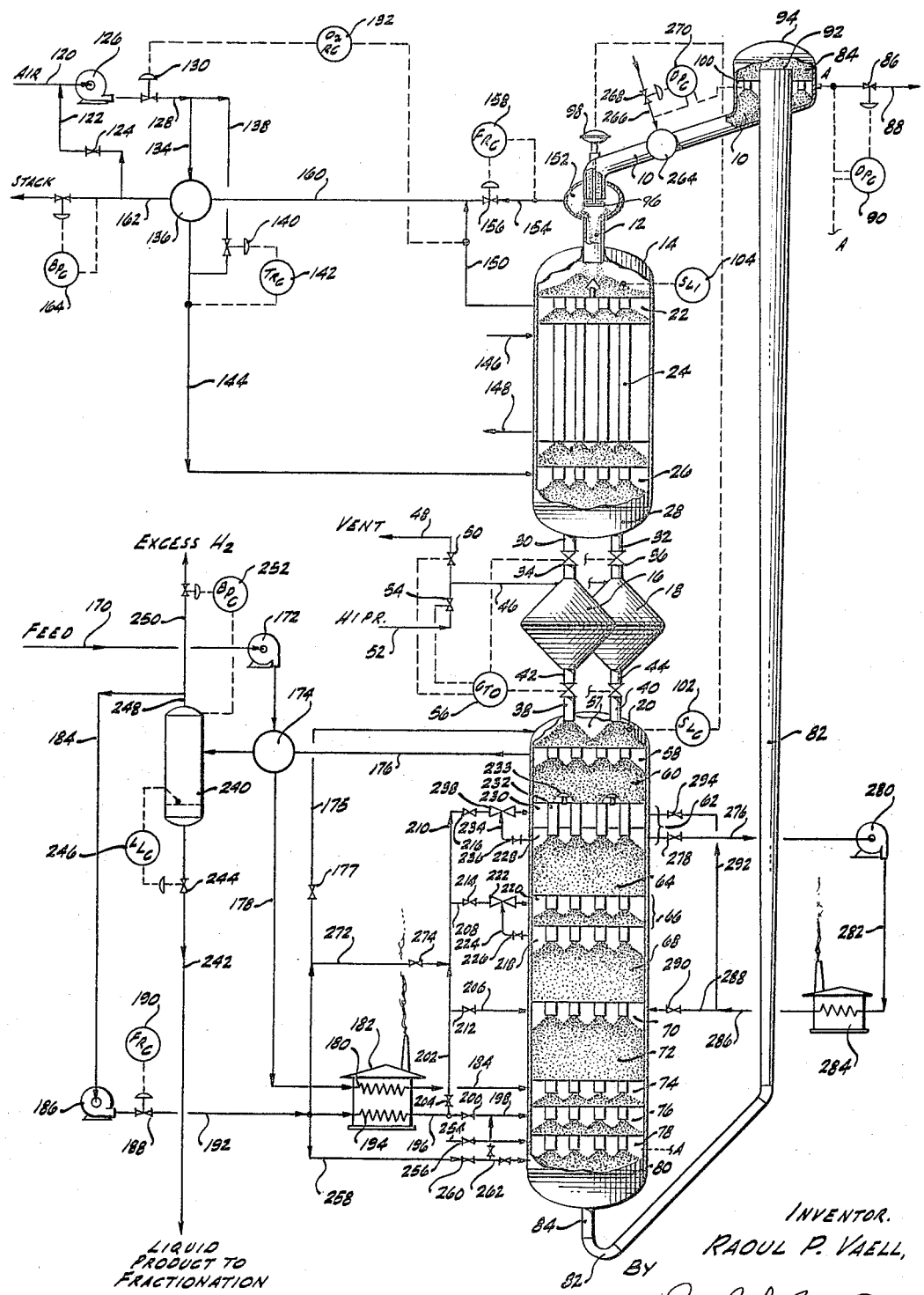

3,267,024
HYDROCARBON CONVERSION PROCESS
Raoul P. Vaell, Los Angeles, and Clyde H. O. Berg, Long Beach, Calif.; said Vaell assignor to Union Oil Company of California, Los Angeles, Calif., a corporation of California
Filed Feb. 12, 1954, Ser. No. 409,958
2 Claims. (Cl. 208—134)

This application is a continuation-in-part of application Serial No. 277,832, filed March 21, 1952 in the names of Clyde H. O. Berg, Raoul P. Vaell and John H. Ballard, now U.S. Patent No. 2,809,922.

This invention relates broadly to the contacting of fluid streams with moving granular solid contact material and in particular it relates to an improved process and apparatus for effecting the circulation of a moving bed of granular solid contact material successively through a low pressure contacting zone and through a high pressure fluid contacting zone. More specifically the present process and apparatus is drawn to an improved hydrocarbon conversion system in which a hydrocarbon stream mixed with recycled hydrogen gas contacts a moving bed of granular hydrocarbon conversion catalyst at a relatively high superatmospheric pressure to produce a desulfurized, reformed, and/or denitrogenated hydrocarbon product of high antiknock and lead susceptibility characteristics, and in which process the spent hydrocarbon conversion catalyst is then passed through a relatively low pressure regeneration zone, operating near atmospheric pressure, wherein the carbonaceous residue which deactivates the catalyst is removed therefrom.

Hydrocarbon fractions in particular and many other fluid reactant streams in general are advantageously treated under reaction conditions of temperature and pressure in the presence of a solid granular contact material, which may or may not have catalytic activity, to produce fluid products having improved properties. In the field of petroleum refining, hydrocarbon fractions boiling between the limits of about 75° F. and 750° F. and including the light and heavy naphthas or gasolines and the light and heavy gas-oil fractions, are treated at relatively high pressures and temperatures in the presence of solid contact materials to desulfurize, denitrogenate, hydrogenate, dehydrogenate, reform, aromatize, isomerize, or polymerize such hydrocarbon fractions to produce such products having desirable properties which particularly well suit them for hydrocarbon cracking feed, gasoline blending stock, or diesel or jet engine fuels and the like.

In the particular fields of gas-oil and gasoline desulfurization and in gasoline reforming, the particular chemical reactions involved are conducted at temperatures ranging between about 600 and aobut 850° F. for desulfurization and at temperatures of from about 700 to about 1100° F. for reforming. The reactions are usually effected in the presence of a catalyst and between about 500 and about 10,000 s.c.f. of hydrogen per barrel. These reactions have been found to be considerably improved by conducting them at elevated pressures ranging from about 50 p.s.i. (pounds per square inch) to about 2500 p.s.i., pressures of the order of between 250 p.s.i. and about 1500 p.s.i. being often used. However, the regeneration of the solid contact material or catalyst employed in such processes is difficultly effected at such elevated pressures and preferably, in order to thoroughly regenerate the solids and to avoid operational difficulties, the regeneration is desirably effected at near atmospheric pressure. Heretofore the difficulty of circulating granular solid material through a high pressure reaction zone and a low pressure regeneration zone, between which the pressure differential may be as high as 2500 p.s.i., has heretofore been insurmountable and in fact such processes have never been accomplished in commercial operations because the cost of the apparatus and the process operation has been prohibitive. Thus, the reaction step has been conducted at pressures much lower than desirable.

In addition, in such hydrocarbon desulfurization and reforming reactions, it has been difficult to compensate for thermal effects occurring during the reaction which tends to change the reaction temperature from the desired value. For example, during hydrocarbon desulfurization, a net exothermic effect is noted which causes the temperature to increase as much as 200° F. in some cases during the reaction. Similarly, in gasoline reforming, the net thermal effect is endothermic and the temperature of the reacting fluid may drop as much as 75 or 100° F. The complexities of mechanical equipment and the process steps necessary to compensate for these temperature changes have heretofore been such that few if any commercial hydrocarbon conversion processes of this type have attempted to correct for these thermal effects.

The present invention is directed to an improved process and apparatus for the continuous contact of fluid streams at substantially different pressures with a recirculating solids stream. The invention is particularly directed to an improved process for hydrocarbon conversions in the presence of a downwardly moving compact bed of granular contact material, which may be a solid catalyst, in a single column or structure and through which the moving bed of granular solids passes in succession by gravity through a low pressure solids regeneration zone, at least one solids pressuring zone in which the pressure of fluids associated with the solid contact material is raised, in a zone of relatively small extent, from the low pressure of the regeneration zone to a relatively high pressure of the reaction zone, and then the solids are passed as a moving bed downwardly to the bottom of the column through the high pressure reaction zone. In combination with these steps is incorporated a novel and improved step for transferring the high pressure granular solids at the bottom of the column upwardly as a moving bed through a conveyance zone to the top of the column where the low pressure of the regeneration zone exists, and which conveyance utilizes preferably a high pressure stream of net product fluid produced in the reaction zone and which is removed from the process through the conveyance zone in such a manner as to circulate the solid material and eliminate the requirement of a separate conveyance fluid. In addition, an improved step is provided in this process for the maintenance of substantially uniform temperatures within the reaction zone which involves the injection of either cold or highly heated recycle gas at a plurality of points along the length of the reaction zone whereby uniform reaction temperatures are obtained. All of the foregoing steps cooperate together to produce in a continuous hydrocarbon conversion process product conversions and liquid yields which are higher than heretofore obtained together with a complete elimination of regeneration problems due to the fact that the novel steps of the process permit the simultaneous contacting of the hydrocarbon fluids with the catalyst at relatively high superatmospheric pressures and the regeneration of the deactivated catalyst thus formed at a relatively low near atmospheric pressure in a single vertical column of considerably reduced height and cost due to the fact that the conventionally required sealing legs have been entirely eliminated in the process and apparatus of this invention. The pressure differentials between the low pressure and high pressure contacting zones may easily be maintained at values several hundred times those permissible with the conventional sealing leg.

It is therefore a primary object of this invention to provide an improved solids-fluid contacting process which includes a relatively high pressure contacting zone and a relatively low pressure contacting zone operating together in a single column and separated by at least one solids pressuring zone of exceedingly reduced extent realtive to the sealing legs conventionally required.

It is a more specific object of this invention to provide a hydrocarbon conversion process employing a single vertical column and in which the solid granular contact material is recirculated from the bottom of the column to the top thereof and downwardly successively through a low pressure regeneration zone, an intermediate solids pressurizing zone, and a relatively high pressure hydrocarbon contacting zone.

It is a still further object of this invention to provide in such a hydrocarbon conversion process the improved step of depressuring at least part of the net make gas, or other fluid product, produced in the high pressure reaction zone from the bottom of said column concurrently with the granular contact material through a conveyance zone to the relatively low pressure of the solids regeneration zone whereby extraneous conveyance fluids are eliminated in the process.

It is a further object of this invention to provide in such a process a specific means for gas injection into the reaction zone to maintain temperature control therein and in which the injected gases are mixed in a jet pump containing a nozzle and a Venturi prior to being reintroduced into the reaction zone.

It is also a fundamental object of the present invention to provide an improved apparatus of substantially reduced height and cost for effecting the above-named objects.

Other objects and advantages of the present invention will become apparent to those skilled in the art as the description thereof proceeds.

Briefly, the present invention comprises an improved process and apparatus for contacting moving solids beds with one or more fluid streams, and specifically it comprises an improved hydrocarbon conversion process in which hydrocarbons are contacted at high pressure with a moving bed of contact material and the reactivated contact material thus formed is regenerated at a very low pressure in a single column of considerably reduced height and in which no solids sealing legs are required. In this improved process the moving bed of granular contact material or catalyst is passed downwardly by gravity successively through a solids elutriation zone and a solids regeneration zone, both operating at a relatively low near atmospheric pressure, a solids pressuring zone in which the granular solids are pressured therein without the use use of sealing legs from the relatively low regeneration pressure to relatively high superatmospheric pressure maintained in a reaction zone, then through the hydrocarbon conversion or reaction zone maintained at a relatively high superatmospheric pressure. The granular solids are then returned from the bottom of the column upwardly through a conveyance conduit or zone to the top thereof in the form of a continuous upwardly moving gravity packed bed concurrently with a conveyance fluid, which is preferably one produced in the high pressure reaction zone, and which depresses during conveyance from from the relatively high reaction zone pressure substantially to the relatively low regeneration zone pressure while lifting the granular solid material. The thus elevated solids, after the depressured conveyance fluid is desengaged therefrom, flow by gravity through the elutriation zone into the regeneration zone at the top of the column for repassage therethrough in the sequence named as a downwardly moving gravity packed bed.

It is through the use of the step of compact solids conveyance in combination with the particular solids pressuring step described that tall sealing legs may be eliminated and the unusually high pressure differentials between the reaction and regeneration zones may be established and maintained.

It should be noted that the granular material moves downwardly through the column by gravity and upwardly through the conveyance zone by means of a concurrent conveyance fluid flow in substantially the same conditions of bulk density. More specifically, the solids existing in all parts of the process, with the single exception of the solids in the elutriation zone, are maintained in compact dense gravity packed form having a bulk density substantially equal to the static bulk density of the solids when at rest. In this way it has been found possible to maintain the exceedingly high differential pressure through the conveyance zone between the bottom of the column (the high pressure reactor) and the top of the column (the low pressure regenerator) when employed with the particular solids pressuring means described below. This type of granular solids conveyance is more specifically described below and it is important to note that the conventional types of solids conveyance including the well-known pneumatic gas lift conveyances in which suspended granular solids are conveyed, and the fluidized types of solids conveyance as well as the mechanical conveyors such as those employing buckets and the like are totally incapable of sustaining pressure differentials much in excess of about 10 p.s.i. per hundred feet. In the process of the present invention, the compact type of solids conveyance can successfully withstand pressure differentials of as high as 2500 p.s.i. per hundred feet and there is in fact no real upper limit to this pressure differential.

This invention especially comprises an improved sequence of operating steps in which hydrocarbon fractions are catalytically desulfurized, denitrogenated and/or reformed in the presence of a moving bed of hydrocarbon conversion catalyst. The moving catalyst bed is passed downwardly by gravity from the top of a single column through a low pressure catalyst regeneration zone, then downwardly through at least one solids pressuring and sealing zone wherein the granular solids are pressured to the relatively high reaction zone pressure at an intermediate point in the column. The thus pressured catalyst then flows downwardly by gravity through the high pressure reaction zone through which the hydrocarbon stream to be converted is passed. To exemplify the operating pressures involved in the present invention, a low pressure regeneration zone, in which the carbonaceous materials are burned by means of oxygen-containing regeneration gases from the spent catalyst is operated at pressures between about 5 and about 200 p.s.i.a (pounds per square inch absolute) preferably between 15 and 100 p.s.i.a, and the high pressure reaction zone is operated at pressures above those on the regeneration zone such as between about 50 and about 2500 p.s.i.a. or higher and preferably in reforming between 200 and 600 p.s.i.a. The nature of the sealing and pressuring zones is such that no interflow of high pressure fluids from the high pressure zone into the upper low pressure zone is possible and the differential pressures which are thus obtainable are totally impossible in the conventional sealing legs previously employed, and which were incapable of maintaining pressure differentials in any way approaching those realized in the present invention. In the present invention the pressuring zone is capable of maintaining pressure differentials of the order of several hundred times these values and occupies a height of the order of from 5 to 15 feet.

The improved process of this invention is particularly successful in the catalytic reforming (paraffin cyclization and naphthene dehydrogenation) of naphtha or gasoline streams at temperatures of the order of from 700° F. to 1100° F. and in the presence of recycle hydrogen in the amounts between about 500 and 10,000 s.c.f. (standard cubic feet) per barrel of naphtha feed. The preferred type of catalyst is the $CoO$-$MoO_3$ or cobalt molybdate type distended on an activated alumina support and analyzing between about 7% and about 22% total $CoO$ plus MoO$_3$ and in which the molecular ratio of CoO to MoO$_3$ is between about 0.4 to 5.0. Some suitable methods of preparation are given in U.S. Patents Nos. 2,369,432, 2,325,033, and 2,486,361. These catalysts also may incorporate between about 3% and about 8% of SiO$_2$ as stabilizers. In such a reforming process there is a net production of hydrogen in the high pressure reaction zone which must be bled from the system to avoid accumulation. Preferably this excess high pressure fluid is discharged from the system by passing it from the bottom of the column that is, the bottom of the high pressure reaction zone, and allowing it to depressure through the conveyance zone concurrently with the spent granular catalyst at a rate sufficient to convey the solid material therethrough in the form of a compact upwardly moving bed having a bulk density substantially equal to the bulk density of the solids when at rest. This density is substantially equal to the bulk density of the downwardly moving bed of solids in the contacting column. At the top of the conveyance zone the pressure is maintained substantially equal to that of the low presshure regeneration zone and the conveyance fluid, which is the excess hydrogen product, is allowed to flow through the conveyance zone at a rate sufficient to maintain this pressure differential.

The desulfurization of gas-oil and naphtha is effected in the process of this invention using the same conditions as above for reforming, except that the temperature range is reduced to between about 600° F. and about 850° F.; the same catalyst hydrogen recycle rate, and pressure conditions are applicable.

In the particular high pressure hydrocarbon conversions mentioned above, namely naphtha reforming and naphtha or gas-oil desulfurization and denitrogenation, a considerable temperature gradient exists within the reaction zone. Hydrocarbon denitrogenation and desulfurization is by nature exothermic and the heat released causes the temperature of the reactants to rise during their progress through the reaction zone. On the contrary, naphtha reforming is endothermic and the heat consumed causes the temperature of the reactants to decrease. The particular method of temperature control herein described has been found particularly advantageous in the high pressure reaction zone of this invention and it involves the injection at a plurality of points along the length of the reaction zone of individual hydrogen recycle gas streams. In hydrocarbon reforming in which the reactant temperature tends to decrease, hydrogen recycle gas, heated to temperatures of the order of 1000 to 1500° F., is either injected directly into the reaction zone or, preferably, is thoroughly mixed with a withdrawn portion of the reacting fluids and the mixture reinjected into the catalyst bed. In the denitrogenation and desulfurization processes, cold hydrogen at temperatures of from about 70 to 100° F. is similarly injected at a plurality of points along the length of the reactor. The introduction rates are controlled to maintain the desired reaction temperature throughout the reaction zone in each case.

In order to maintain the very high pressure differentials between the reaction and regeneration zones without the use of sealing legs, the granular contact material is conveyed from the bottom to the top of the contacting column through a conveyance zone in which the granular solids are maintained substantially at their static bulk density, that is, in the form of an upwardly moving substantially compact dense packed mass. In order to accomplish this conveyance, several essential requirements must be met. These essentials are described below.

The granular solids flow by gravity from the bottom of the column with the conveyance fluid into the conveyance conduit inlet and are then transferred through the conveyance conduit in compact form by means of the concurrently depressuring conveyance fluid. The frictional forces generated by the conveyance fluid depressuring through the interstices of the fluid permeable compact mass of granular solids are sufficient to generate a pressure gradient in the flow direction to counteract opposing forces of friction of the solids sliding against the walls of the conduit as well as the opposing force of gravitation. Thereby movement of the compact porous granular mass in the direction of decreasing conveyance fluid pressure is established and maintained so long as solids are fed at the inlet and removed from the outlet.

The depressing conveyance fluid generates a pressure drop per unit length of conduit $dp/dl$ sufficient to overcome the opposing gravitational forces ($\rho_s \cos \theta$), wherein $\rho_s$ is the bulk density of the granular solids, and $\theta$ is the angular deviation of the conveyance conduit from an upward vertical reference axis. The ratio of the former to the latter is $$\frac{\frac{dp}{dl}}{\rho_s \cos \theta}$$

This factor is termed the conveyance force ratio and is the ratio of the force tending to move the solids through the conveyance conduit to the opposing forces of gravity tending to restrain such flow. The conveyance fluid must be depressed through the conduit at a rate sufficient to raise the conveyance force ratio to a value greater than 1.0 (factors in any consistent units) in order that the conveying force exceed the forces resisting flow. The amount by which the conveyance force ratio must exceed a value of 1.0 is equal to the magnitude of the friction forces also tending to resist solids flow.

The granular solids are maintained during conveyance in compact form at their static bulk density by means of the application of a thrust or solids compressive force on the stream of solids issuing from the outlet of the conveyance conduit. Various means are available for applying such a force which has the effect of restricting the discharge rate of granular solids from the conveyance conduit but has virtually no effect on the discharge of the conveyance fluid therefrom. A transverse thrust plate or a grid may be spaced opposite and adjacent the outlet opening, or a static bed of solids may be used to submerge this outlet.

Thus, it is essential that the inlet of the conveyance conduit be kept submerged in a bed of solids to be conveyed, that the conveyance fluid flows through the conveyance zone at a rate sufficient to generate a conveyance force ratio greater than 1.0 throughout the conveyance zone, that means be provided for applying a compacting force against the solids discharging from the conveyance zone, and also that a solids flow control means be provided to regulate the rate at which granular solids are withdrawn from the vessel surrounding the conveyance zone outlet so as to maintain the outlet submerged in a moving bed of discharged solids.

The present invention will be more readily understood from the following description referring to the accompanying drawing which illustrates schematically a flow sheet of the process of this invention and also includes an elevation view in partial cross section of the improved single column apparatus employed to carry out the process.

The description of this drawing will be given by way of an example of the method of this invention applied to the catalytic reforming of a petroleum naphtha in the presence of a cobalt molybdate catalyst.

Feed naphtha is reformed in this process at a rate of 10,000 barrels per day. This feed stock has the following physical properties.

*TABLE 1*

| | |
|---|---:|
| Boiling range, °F. | 150–400 |
| Gravity, °API | 52 |
| Sulfur, weight percent | 1.9 |
| Nitrogen, weight percent | 0.015 |

The granular reforming catalyst consists of cobalt molybdate impregnated on 3/16-inch activated alumina granules, it analyzes about 9% $MoO_3$ and 3% CoO by weight. The catalyst is circulated through the column at a rate of 5000 pounds per hour.

The contacting column of this invention consists of 3 essential components; namely, low pressure regeneration vessel 14 operated at a pressure of about 70 p.s.i.a., solids pressuring vessels 16 and 18 which vary in pressure between about 70 and 400 p.s.i.a., and high pressure reaction vessel 20 operated at a pressure of about 400 p.s.i.a. The regeneration vessel is provided at successively lower levels therein with regeneration gas disengaging zone 22, tube bundle 24, regeneration gas engaging zone 26 and lower zone 28 provided with suitable means for maintaining uniform solids withdrawal throughout the cross-sectional area of the regeneration vessel. This means may consist in a plurality of perforated transverse solids flow distributing trays, a reciprocating solids feeder, or other well-known means.

The solids pressuring vessels 16 and 18 are provided respectively with solids inlets 30 and 32 having valves 34 and 36 respectively. These pressuring vessels are also provided with solids outlets 38 and 40 controlled respectively by valves 42 and 44. Valves 34, 36, 42, and 44 are mechanically actuated valves which are intermittently operated according to a predetermined time cycle so that as one pressuring vessel is filling with solids and being pressured, the other vessel is simultaneously being emptied and being depressured so as to effect a substantially continuous withdrawal of solids at low pressure from regeneration vessel 14 and a substantially continuous introduction of pressured solids into the top of high pressure reaction vessel 20. Although two individual pressuring vessels are shown, either a single vessel or 3 or more may also be employed.

Pressuring gas is injected and depressured gas is released from pressuring vessel 16 through manifold 46 which vents through line 48 controlled by valve 50 and which receives high pressure fluid through line 52 controlled by valve 54. An identical vent and pressuring system, not shown, is also provided pressuring vessel 18 and any additional pressuring vessel which may be employed. Valves 50 and 54 are also mechanically actuated valves which are operated according to the predetermined time cycle so as to pressure and depressure the solids pressuring vessels at the appropriate time. Cycle timer operator 56 is a control instrument connected to each of the mechanically actuated valves named so as to control their operation in sequence to effect the continuous pressuring and depressuring of the vessels 16 and 18 between the pressure limits of 70 and 400 p.s.i.a.

Preferably, in the solids pressuring cycle described above, a pressuring vessel which has just been emptied and contains fluid at high pressure, is preferably placed first in communication with another pressuring vessel which is filled with solids and exists at the relatively low pressure of the regeneration zone. Thus, the pressuring of each vessel is effected in two stages; first, by raising its pressure to an intermediate value while depressuring another vessel to that pressure from a relatively high pressure, and second, injecting high pressure gas to raise the pressure from the intermediate value to the relatively high pressure of the reaction zone.

The continuous stream of high pressure solids is introduced directly into the top of reaction zone 20 which is provided at successively lower levels therein with seal gas zone 57, reactor effluent disengaging zone 58, fourth reaction zone 60, fourth hydrogen injection zone 62, third reaction zone 64, third hydrogen injection zone 66, second reaction zone 68, second hydrogen injection zone 70, first reaction zone 72, feed injection zone 74, recycle gas injection zone 76, stripping steam engaging zone 78, and bottom zone 80. In the elevation view of reaction vessel 20 several modifications of the hydrogen injection zones are shown. It is not intended that each of the modifications shown be used simultaneously, but rather that one or the other of the types be used exclusively.

As in the bottom zone 28 of regeneration vessel 14, a suitable type of granular solids flow distribution means, not shown, is disposed in bottom zone 80 so as to provide uniform solids withdrawal from the bottom of the column.

The spent granular catalyst, containing a hydrocarbonaceous residue remaining after contact with the hydrocarbon stream being reformed, flows downwardly from the bottom of the column and upwardly through conveyance conduit 82. A compact accumulation of spent catalyst submerges inlet opening 84 of the conveyance conduit and a conveyance fluid, to be more particularly described hereinafter, passes downwardly concurrently with the compact granular solids through inlet opening 84 and into the conveyance conduit. The pressure existing at this point is substantially equal to the pressure (400 p.s.i.a.) maintained in reaction vessel 20. However, the pressure maintained in solids receiving zone 84 at the top of conveyance zone 82 is controlled to be substantially equal to the pressure (70 p.s.i.a.) maintained in low pressure regenerator 14. This low pressure is maintained in solids receiving zone 84 by means of valve 86 disposed in conveyance fluid outlet line 88. Valve 86 is actuated by differential pressure controller 90 which is connected at points A at opposite extremities of conveyance conduit 82 and operates valve 86 to maintain the predetermined pressure differential desired between the regeneration zone and the reaction zone, in this example 330 p.s.i. This pressure differential must of course be greater than that necessary to convey the compact solids, that is, it must be greater than the product of $dp/dl$ (in pounds per square foot per foot calculated from the equation above using a conveyance force ratio greater than about 1.0) and the height in feet of the conveyance conduit 82. In this example the conveyance conduit is 100 feet high and the theoretical pressure differential necessary to convey this solid catalyst is 55 p.s.i.

The concurrent flow of conveyance fluid thus resulting generates a substantially uniform pressure gradient throughout the length of conduit 82 which is more than sufficient to overcome downwardly acting forces of gravity and friction which act upon the individual granules of the upwardly moving compact mass and maintain the upwardly moving mass in motion.

To maintain the granular solids during conveyance in non-fluidized and substantially compact form, outlet opening 92 of conveyance conduit 82 may be placed immediately adjacent roof 94 of solids receiving zone 84. The solid granular catalyst is thus discharged against the roof of the vesesl, a thrust force is thereby applied to the discharging solids to prevent fluidization in conduit 82 and to maintain the solids therein as an upwardly moving mass whereby the flow of lift gas may be resisted and the high differential pressure of 330 p.s.i. generated. The thus discharged solids flow downwardly by gravity at the rate of 5000 pounds per hour as determined by the setting of valve 96 as operated by pneumatic head works 98, through conveyance fluid disengaging zone 100 at an intermediate point in solids receiving vessel 84. The conveyance fluid is thus disengaged from the compact solids and removed as described above. The solids at low pressure now, because of the depressuring fluid which conveyed them through conduit 82, pass downwardly through transfer line 10 into elutriation zone 12. Herein, the solids pass downwardly as a shower countercurrent to a flow of flue gas which is controlled by valve 156 at a rate sufficient to suspend and carry away undesirably small sized solids.

The rate at which granular solids are conveyed through conduit 82, which is equal to the rate at which the catalyst flows downwardly through the column, is controlled by the setting of valve 96 which controls the rate at which the compact bed of solids is withdrawn from solids receiving zone 84 through transfer line 10. Because the solids are compact in the system, they cannot be introduced into the solids receiving vessel 84 at a rate any different from the rate at which they are moved therefrom through transfer line 10. Solids valve 96 is actuated by pneumatic head works 98 in accordance with solids level controller 102 which detects the level of granular catalyst in reactor 20. If this level tends to drop, level controller 102 closes valve 96 to reduce the rate at which granular solids are withdrawn from reactor 20 which in turn causes the solids level to rise in the upper portions thereof.

The catalyst circulation rate may conveniently be independently controlled by a reciprocating solids feeder at the bottom of reactor 20, or at the bottom of regenerator 14, or by the rate at which timer 56 operates to fill and empty the pressuring vessels.

The solids level existing in the upper portion of regenerator 14 is the only free level in the system, this level is detected by solids level indicator 104 and serves to indicate the catalyst inventory in the system. Additional catalyst as necessary may be added by any convenient means, not shown.

The spent reforming catalyst, containing about 5% by weight of coke, is regenerated by contacting it in low pressure regeneration zone 14 with a flow of oxygen-containing gas such as air which may or may not be diluted with recycled flue gas in order to control the rate at which the hydrocarbonaceous deposit on the spent catalyst is burned. Atmospheric air is introduced through line 120, is combined with recycled flue gas, if any, passed through line 122 at a rate controlled by valve 124, and the mixture is passed by means of blower 126 through line 128 at a rate controlled by valve 130 in accordance with oxygen recorder controller 132. This fresh regeneration gas passes in part through line 134 into and through exchanger 136, part of this gas bypassing exchanger 136 through line 138 at a rate controlled by valve 140 in accordance with temperature controller recorder 142, to provide a fresh regeneration gas of a temperature between about 500° F. and 700° F. This preheated regeneration gas flows through line 144 into regeneration gas engaging zone 26. From here it passes upwardly countercurrent to the downflowing spent solids in tube bundle 24 and a temperature of between about 700° F. and 1100° F. is maintained within the regenerator to regenerate the spent catalyst and to produce a preheated regenerated and substantially carbon-free catalyst.

In order to control the temperature, a coolant which may be atmospheric air, or water, or gases to be preheated for use in the system is passed through the shell side of tube bundle 24 by means of lines 146 and 148. The spent regeneration gas, consisting essentially of flue gas, passes upwardly into the upper portion of regenerator 114 wherein it is divided into two streams. The first stream is withdrawn through line 150 from disengaging zone 22 and the second portion passes upwardly through elutriation zone 12 into elutriation gas disengaging zone 152 surrounding solids valve 96. This second portion of gas is withdrawn therefrom through line 154 at a rate controlled by valve 156 in accordance with flow recorder controller 158. This second stream is controlled at a value sufficient to suspend catalyst fines and remove them from the circulating catalyst passing downwardly as a shower through elutriation zone 12.

The two portions of spent flue gas or regeneration gas are subsequently combined and flow through line 160 through regeneration gas exchanger 136 wherein it is cooled to supply heat to the fresh incoming air or other regeneration gas. The cooled flue gas is removed therefrom at a temperature of about 500° F. through line 162 at a rate controlled by back pressure controller 164 and is discharged therefrom to a stack.

In the reforming of petroleum naphthas by means of cobalt molybdate catalyst, a relatively low solids circulation is required and accordingly the regeneration of the catalyst does not liberate excessive quantities of heat. The heat liberation is in the order of 4,000,000 B.t.u. per hour for a 10,000 barrels per day plant. Accordingly, adequate cooling is obtained by blowing moderate quantities of atmospheric air or recycle hydrogen gas or recycle regeneration gas through the shell side of tube bundle 24.

The flow of naphtha reactants and hydrogen into and through the high pressure reactor 20 is described immediately below. The reaction temperature is preferably controlled to values between about 800° F. and 1000° F., a value of 900° F. being typical. The naphtha feed stock having the properties given above is introduced at a rate of 10,000 barrels per day through line 170 and is passed by means of feed pump 172 through exchanger 174 wherein the feed is preheated and partially vaporized in exchange with the reactor effluent flowing from disengaging zone 58 through line 176 hereinafter described. The preheated naphtha at a temperature of about 600° F. is then passed by means of line 178 into and through naphtha vaporizing coil 180 in fired vaporizer 182. Herein the naphtha vapor is heated to a temperature of about 900° F., somewhat less if olefins are present, and is passed through line 184 into naphtha engaging zone 74. The naphtha thus introduced passes through the reactor as hereinafter described.

Recycle hydrogen, separated from the reactor effluent as described more fully below, passes through line 184 under the influence of recycle gas blower 186 at a rate controlled by valve 188 and flow recorder controller 190, through line 192 from which the hydrogen stream flows through hydrogen recycle gas preheating coil 194 in furnace 182. The preheated hydrogen is withdrawn therefrom at a temperature of about 1150° F. through line 196 and is divided into 4 portions, the first flowing through line 198 controlled by valve 200 into first hydrogen injection zone 76, the second, third, and fourth streams being removed from manifold 202 controlled by valve 204 respectively through lines 206, 208, and 210 controlled respectively by valves 212, 214, and 216 into second, third, and fourth hydrogen engaging zones 70, 66, and 62. A minor portion of the hydrogen is passed as a seal and catalyst pretreating gas into seal gas zone 57 in the uppermost part of reactor 20 through line 175 controlled by valve 177.

As described above, the preheated naphtha vapor is injected into feed engaging zone 74, and the first hydrogen injection stream is introduced to engaging zone 76. These two streams combine to form a reactant mixture of naphtha vapor and hydrogen which passes upwardly countercurrent to the downflowing bed of cobalt molybdate reforming catalyst and passes successively through first, second, third, and fourth reaction zones 72, 68, 64, and 60, respectively.

Due to the endothermic nature of the reforming reactions, the temperature of the vapor just below injection zone 70 has dropped to a temperature of about 875° F., but is raised to a temperature of about 920° F. by the injection of 10,000,000 s.c.f. per day of hydrogen containing gas at 1150° F. thereinto through line 206. The heated hydrogen and the naphtha mix in engaging zone 70 and subsequently pass through second reaction zone 68. These temperature changes occur in each of the individual reaction zones. The rate and/or the temperature of the injected stream are controlled to regulate the temperature in the reaction zone to provide a relatively constant temperature therein.

Hydrogen injection zone 66 is a modified form thereof which may optionally be used and which involves the removal of at least part of the naphtha from the catalyst bed, mixing it thoroughly with heated hydrogen, and injecting the heated mixture back into the catalyst bed for passage through the subsequent reaction zone. In this modification, hydrogen injection zone 66 consists of a lower reactant disengaging zone 218 and an upper engaging zone 220. Jet pump 222 is provided into which line 208 discharges the third injection stream of hydrogen. Line 224 provided with valve 226 discharges naphtha from disengaging zone 218 into the low pressure point of the jet pump in which it is thoroughly mixed with the injected stream of heated hydrogen. The mixture then is introduced directly from jet pump 222 into engaging zone 220 for upward passage through reaction zone 64. The temperature is thus raised from about 875° F. to about 920° F. but again falls to about 875° F. at the outlet of third reaction zone 64.

Hydrogen injection zone 62 comprises another modification which consists of a lower disengaging zone 228, an upper engaging zone 230 and a plurality of relatively short sealing legs 232 through which the reforming catalyst gravitates and providing a solids filled passageway restricting the reactant naphtha flow therethrough. This forces at least the major portion of naphtha from disengaging zone 228 through line 234 controlled by valve 236 into the low pressure point of jet pump 238 wherein again it is mixed with the fourth stream of heated hydrogen producing a heated mixture having a temperature of about 920° F. This mixture then passes directly into engaging zone 230, passes upwardly through vapor risers 233 and then through fourth reaction zone 60. The jet pumps may be located either inside or outside the column. The jet pump has two purposes: (1) to draw reactants out of the previous catalyst bed by means of the reduced pressure created in the pump by the injected hydrogen stream, and (2) to act as a mixing device for the withdrawn reactants and the added hydrogen. The over-all purpose is to prevent hot spots and excessive cracking which are harmful to catalyst and reduce liquid yield. There is no catalyst in the jet pump even if it is located in the bed.

The reactor effluent is accumulated in effluent disengaging zone 58 wherefrom it is removed at a temperature of about 890° F. and passed through line 176 through interchanger 174 and through other cooling means if necessary, not shown, to cool and partially condense the effluent. The cooled mixture, at a temperature of about 110° F., is thus discharged into separator 240 in which a vapor rich in hydrogen and including the net product hydrogen of the process accumulates in the upper portion of separator 240 while the reformed naphtha product accumulates as a liquid phase in the bottom thereof. The liquid product is removed therefrom at a rate of 9,500 barrels per day through line 242 controlled by valve 244 and liquid level controller 246.

The liquid product thus obtained has the following characteristics:

*Table 2*

| | |
|---|---|
| Boiling range, ° F. | 100–410 |
| Gravity, ° API | 55 |
| Sufur, weight percent max. | 0.01 |
| Nitrogen, weight percent | 0.001 |
| Knock rating (clear) | 87 |
| Knock rating (3 ml. TEL) | 95 |

The sulfur removal is 99.5%, the nitrogen removal is 93.4%, the boiling range is broadened slightly, the gravity is almost unchanged, and volumetric yield of 400 °F. end point $C_4$ free gasoline is the unusually high value of 95% by volume.

The uncondensed portion is removed from separator 240 through line 248 and a first portion, described above, is recirculated through vessel 148 as the hydrogen recycle gas required in the process. Any excess hydrogen may be removed from line 250 at a rate controlled by back pressure controller 252, but preferably it is employed as hereinafter described.

In the present process, several granular solids conveyance fluids may be employed. One involves the injection of a stripping gas such as steam into engaging zone 78 through line 254 controlled by valve 256. A portion of this stripping steam passes upwardly to prevent downflow of the reactant gas containing hydrogen and naphtha vapor, while the remaining portion passes downwardly concurrently with the spent catalyst and is depressured therewith through conveyance conduit 82 to provide the pressure gradient necessary to convey the catalyst.

The preferred method for granular solids conveyance is to employ a portion of the hydrogen recycle gas because a sufficient quantity is produced during the reforming reaction at the elevated pressure and this net product is conveniently depressured from the system through the conveyance conduit to provide the needed pressure gradient between the reactor and the regenerator, and for lifting. In this modification, although a portion of the heated recycle gas introduced into zone 76 may be used, it is preferred to bypass unheated excess hydrogen through line 258 controlled by valve 260 around heater 182, through line 262 into an engaging zone, not shown but similar to the others, in the bottom of the column. This net production of recycle gas is then depressured from the elevated reaction zone pressure of 400 p.s.i.a. to the relatively low pressure of 70 p.s.i.a. existing in regeneration zone 14 by passing it through conveyance conduit 82 and thereby conveying the spent catalyst. In this manner a net product of the process which must be removed ordinarly at high pressure is hereby depressured from the system under conditions whereby it performs a necessary function in the process and eliminates the usual requirement of a separate conveyance medium.

When recycle hydrogen is employed as the conveyance medium, a sealing gas such as steam is introduced into upper transfer line 10 through seal gas engaging zone 264 by means of line 266 at a rate controlled by valve 268 and differential pressure controller 270. The stripping gas thus introduced passes partly concurrently with the solids into elutriation gas disengaging zone 152 and partly counter-currently through transfer line 10 for removal with the conveyance fluid and thus the intermixing of flue gas and the hydrogen-rich conveyance gas is prevented.

A second modification for counteracting the normal temperature decrease in naphtha reforming operations due to the endothermic reactions which take place is also shown in the accompanying drawing. The temperature tends to rise in first reaction zone 72 due to olefin hydrogenation, if any olefins are present, and also due to a certain amount of hydrocracking which takes place. However, the temperature would drop continuously throughout reaction zones 68, 64, and 60 if no compensation therefor were made. Accordingly, another method for maintaining a uniform temperature profile throughout the individual reaction zones is to remove a portion of the naphtha and hydrogen reactant gas mixture from an intermediate point at zone 228 in the downstream half of the reactor 20 near the top thereof, pass it through line 276 controlled by valve 278 by means of reactant recycle blower 280 and line 282 through interheater 284 wherein the temperature is raised to about 920° F. This reheated fraction of the reactant mixture then passes through line 286 and is split into two parts; the first part passing through line 288 at a rate controlled by valve 290 at an intermediate point (injection zone 70) in the upstream half of the reactor and a second part passing through line 292 controlled by valve 294 into the downstream half of the column at intermediate injection zone 230 which is downstream from zone 228 at which the original reactant mixture portion was removed.

In this modification, it is seen that the central portion of the reactor contains, in addition to the net throughput of the reactant mixture, an additional heated recycle stream of reactant mixture which serves to boost the temperature existing in the intermediate portion of the reactor. This is due to the fraction of reheated reactant introduced just above naphtha inlet 74. The temperature present in fourth reaction zone 60 is raised by injecting thereinto the second reheated portion of reactant mixture through line 292. A recycle rate of about 300% of the net reactant throughput is sufficient although percentages ranging from about 100% and about 500% may be used depending upon the normal rate of temperature decrease.

The process of the invention just described above may also be employed for the desulfurizing and/or denitrogenating of gasolines or gas-oils in the presence of the same catalyst and in the presence of recycle hydrogen, but at lower non-reforming temperatures. In such operations, the reactions which take place are exothermic and the temperature of the reactant mixture rises during transfer through the reactor. Accordingly, hydrogen recycle gas injection is employed in this invention for reducing these temperatures by injecting cool hydrogen into the second, third, and fourth hydrogen injection zones 70, 66, and 62 respectively. In this type of operation valve 204 is manifold 202 is closed and unheated recycle hydrogen passes from line 192 through line 272 controlled by valve 274. In each case sufficient hydrogen at a temperature of about 80° F. is injected to cool the reactant mixture. This effectively raises the proportion of hydrogen present in the gas mixture as the reactant mixture progresses through reactor 20. This increase in hydrogen concentration assists in the removal of last traces of sulfur in the naphtha or gas-oil and counteracts the increasing concentration of hydrogen sulfide which is generated in the system. In such operations, conventional means not shown may be employed to remove hydrogen sulfide and/or ammonia from the recycle stream. It is accordingly found that in this system liquid yields of naphtha or gas-oil are obtained which range between 98% and 103% by volume and the weight percent sulfur in the product is reduced to values well below 0.01% by weight.

Although the foregoing process and apparatus was described in connection with the desulfurization and reforming of hydrocarbon fractions in contact with cobalt molybdate catalyst, it should be understood that the mechanical advantages of the apparatus in permitting simultaneous high pressure and low pressure fluid-solids contact in a single column of substantially reduced height, may be realized in other processes employing other catalysts and other reactant fluids, and even in high pressure fluid adsorption and low pressure desorption processes using solid granular adsorbents. In addition, it should be understood that although other reforming and desulfurization catalysts may be employed in the present invention, cobalt molybdate is the preferred catalyst since it has both desulfurization and reforming activity and thus a given installation may be employed to remove sulfur and nitrogen from either naphtha or gas-oil fractions under certain temperature and pressure conditions, or by changing these temperature and pressure conditions, a petroleum naphtha or other low-grade gasoline may be reformed to reproduce premium-grade internal combustion engine fuels. In the example process above, simultaneous aromatization, desulfurization, and denitrogenation were effected with cobalt molybdate catalyst.

In the present invention applied to naphtha reforming and desulfurization, the preferred operating conditions with a cobalt molybdate catalyst are as follows:

*Table 3*

| | |
|---|---|
| Liquid hourly space velocity | 1.0 |
| Catalyst residence time in reactor | 24 hours. |
| Average reactor temperature | 900° F. |
| Average reactor pressure | 400 p.s.i.g. |
| Hydrogen to naphtha ratio, s.c.f. per barrel | 4,000. |

When the process of this invention is applied to the desulfurization and denitrogenation of gas-oil fraction with a cobalt molybdate catalyst the following are preferred operating conditions:

*Table 4*

| | |
|---|---|
| Liquid hourly space velocity | 2.0. |
| Catalyst residence time in reactor | 24 hours. |
| Average reactor temperature | 700° F. |
| Average reactor pressure | 600 p.s.i.g. |
| Hydrogen to feed ratio, s.c.f. per barrel | 4,000. |

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

We claim:

1. In a reforming system in which a granular contact material is caused to move through an enclosed cyclic path including a reforming zone and a reconditioning zone having its point of contact material entry at an elevation substantially above the point of contact material exit from the reforming zone and wherein the contact material moves downwardly through at least a portion of each of said zones as a compact bed and wherein the reforming operations are conducted at a pressure above that in the reconditioning zone by an amount at least greater than the value of the calculated head of a compact column of said contact material equal in height to the elevation differential between said points of entry and exit, the method for effecting continuous transfer of the contact material from the reforming zone to the reconditioning zone which comprises: permitting the contact material to be forced upwardly through at least one laterally confined unobstructed passage by the gas pressure differential between the two zones, the passage extending upwardly from the lower section of the reforming zone to a location from which it may flow by gravity onto the bed of contact material in the reconditioning zone, and restricting the flow of contact material in the column in substantially compacted form, whereby the gaseous pressure on the contact material is gradually reduced during its transfer through the passage.

2. In a hydrocarbon conversion process in which a granular contact material is gravitated as a substantially compact mass through reaction and reconditioning zones located one above the other, the lower zone being maintained at a substantially higher pressure than the upper zone, the improvement which comprises: withdrawing granular material downwardly from the high pressure zone to a feeding zone as a continuously flowing substantially compact unobstructed column, introducing an inert gas into said feeding zone at an advanced pressure, so as to maintain the pressure in said zone approximately equal to that in the high pressure zone and drive the granular material upwardly through a laterally confined passage into a partially enclosed region about the upper end of the passage, gravitating the contact material downwardly in said region to a level below the upper end of the passage as a substantially compact column of restricted cross-section, introducing the contact material onto the top of a gravitating bed of contact material in a receiving zone of enlarged cross-section, at a level below the top of said zone, withdrawing gas from said receiving zone at a level above the top of the gravitating bed of contact material, so as to take substantially the entire pressure drop from the high pressure zone across the lift passage, withdrawing contact material downwardly from the bottom of the receiving zone as a continuous unobstructed column of contact material, and controlling the flow rate of the contact material at the bottom of the column, so as to control the circulation rate of the contact material in the entire conversion system.

References Cited by the Examiner

UNITED STATES PATENTS

| | | | |
|---|---|---|---|
| 2,301,044 | 11/1942 | Heard et al. | 196—50.2 |
| 2,304,183 | 12/1942 | Layng et al. | 196—50.2 |
| 2,408,600 | 10/1946 | Berg | 196—52.2 |
| 2,443,402 | 6/1948 | Schulze | 196—52 |
| 2,541,077 | 2/1951 | Leffer | 196—52.2 |
| 2,543,005 | 2/1951 | Evans | 196—52.2 |
| 2,546,625 | 3/1951 | Bergstrom | 196—28 |
| 2,567,207 | 9/1951 | Hoge | 196—52.2 |
| 2,604,436 | 7/1952 | Adey et al. | 196—52.2 |
| 2,623,842 | 12/1952 | Robinson | 196—52.2 |
| 2,684,390 | 7/1954 | Bills | 196—52.2 |
| 2,684,873 | 7/1954 | Berg | 196—52.2 |
| 2,684,930 | 7/1954 | Berg | 196—52.2 |
| 2,690,056 | 9/1954 | Bergstrom | 196—52.2 |
| 2,705,216 | 3/1955 | Drew | 196—52.2 |
| 2,726,994 | 12/1955 | Elliott | 196—52.2 |
| 2,756,192 | 7/1956 | Bergstrom | 196—52.2 |
| 2,758,059 | 8/1956 | Berg | 196—28 |
| 2,760,843 | 8/1956 | Kollgaard | 23—1 |
| 2,854,405 | 9/1958 | Bergstrom | 208—175 |

OTHER REFERENCES

New Lift Technique, Weber Oil and Gas Journal. Aug. 11, 1952, p. 75.

DELBERT E. GANTZ, *Primary Examiner.*

EARL M. HUTCHINSON, JAMES S. BAILEY, ALLAN M. BOETTCHER, ABRAHAM RIMENS, ALPHONSO D. SULLIVAN, *Examiners.*

R. E. STRAUSS, H. LEVINE, *Assistant Examiners.*